Dec. 6, 1966  H. W. STIER  3,289,271
INDEXABLE CUTTING INSERTS
Filed Oct. 13, 1964
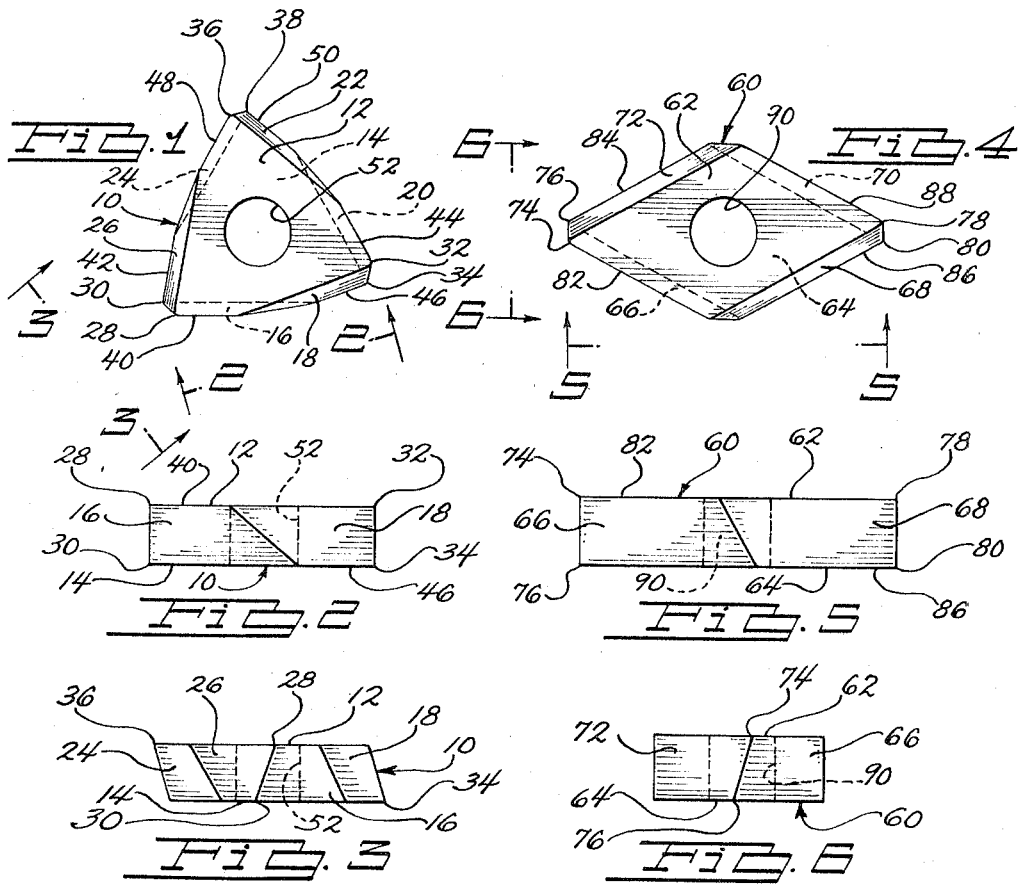
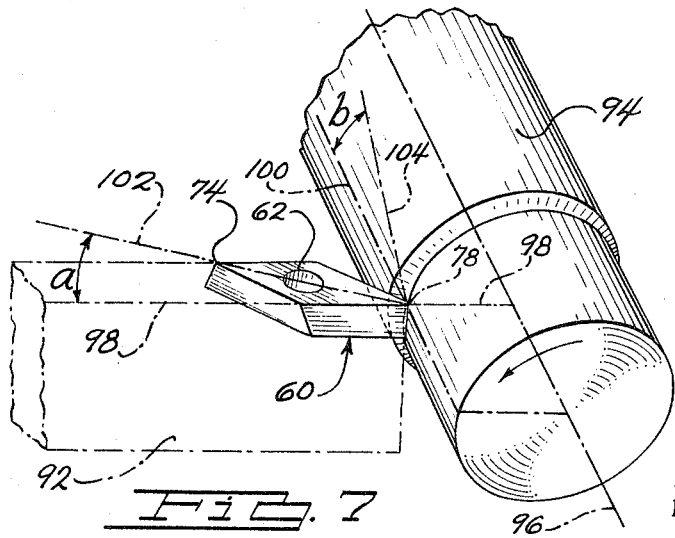
INVENTOR.
HENRY W. STIER
BY
Bower & Patalidis
ATTORNEYS

3,289,271
INDEXABLE CUTTING INSERTS
Henry W. Stier, Dearborn Heights, Mich., assignor to Willey's Carbide Tool Company, Detroit, Mich.
Filed Oct. 13, 1964, Ser. No. 403,546
2 Claims. (Cl. 29—95)

This invention relates to indexable cutting inserts, particularly this invention relates to replaceable indexable cutting inserts having several cutting edges and which can be mounted in a tool holder in such a way as to present to a workpiece any one of the cutting edges so that the cutting edge cuts the workpiece with a negative back rake and a positive side rake.

Replaceable indexable cutting inserts made of ultra-hard material, such as carbides and the like, commonly available on the market, consist generally of prismatic blocks having to polygonal parallel faces and several sides regularly disposed in planes at a right angle to the parallel faces. Such inserts are mounted in a pocket or recess in a tool holder in such a manner that the insert cuts the workpiece by means of its exposed cutting edge presenting a negative back rake and a negative side rake to the workpiece. The negative back rake is dictated principally by consideration of stress distribution through the material of the insert, heavy material removal, workpiece surface finish, stress imposed by the machining equipment, etc., while the negative side rake is dictated primarily by the geometry of the insert having right angle cutting edges compelling to incline the insert in relation to the workpiece so as to provide for side relief angle.

Replaceable indexable cutting inserts providing for side relief angle are however not uncommon. Typical examples of such inserts are described and illustrated in United States Patents Nos. 3,066,385 and 3,104,452. Such inserts, generally called positive rake bits or inserts, consist of prismatic blocks having polygonal parallel faces, and having sides disposed at an angle of less than ninety degrees relatively to one of the polygonal faces so as to provide acute cutting edges corresponding to one face only. Such inserts, although indexable, cannot be turned over end to end, with the result that positive rake inserts have only one-half of the theoretical number of available cutting tips or edges as compared to a negative rake insert. Furthermore, the geometry of positive rake inserts hitherto available results in weakened cutting tips because of the overhang of the cutting tips being deprived of substantial material support directly under the corner subjected to most of the workpiece cutting force.

An important object, therefore, of the invention is to provide indexable cutting inserts which can be mounted in a tool holder so as to present to a workpiece a cutting edge with a negative back rake and positive side rake. Another object of the invention is to provide indexable cutting inserts usable with negative back rake and positive side rake and which can be reversed, or turned end to end, when all the cutting edges on one face are worn, and which provide substantial material thickness under the cutting tips.

Other objects and advantages of replaceable indexable cutting inserts according to the invention will become apparent to those skilled in the art when the following description is read in conjunction with the accompanying drawings wherein:

FIG. 1 represents a replaceable indexable cutting insert according to the present invention;

FIG. 2 is a side elevational view of the insert of FIG. 1, as seen from line 2—2 of FIG. 1;

FIG. 3 is a front elevational view of the insert of FIG. 1, as seen from line 3—3 of FIG. 1;

FIG. 4 is a "diamond-shaped" insert according to the invention;

FIG. 5 is a side elevational view of the insert of FIG. 4, as seen from line 5—5 of FIG. 4;

FIG. 6 is a front elevational view of the insert of FIG. 4, as seen from line 6—6 of FIG. 4; and FIG. 7 is a perspective schematic illustration of an example of use of the insert of FIGS. 4–6 in a turning operation.

Referring now to the drawings, and more particularly to FIGS. 1–3 thereof which represents an example of a replaceable indexable cutting insert according to the invention, the insert consists of a prismatic block, designated generally by numeral 10, having two polygonal parallel faces 12 and 14 of a generally trigonal shape or regular uneven hexagon. The prismatic block 10 is provided with sides 16, 18, 20, 22, 24 and 26 disposed, in relation to the faces 12 and 14, at angles other than ninety degrees so as to define cutting tips 28 and 30, 32 and 34, and 36 and 38. The junction of face 12 with side 16 determines cutting edge 40 proximate to the cutting tip 28. Similarly the junction of side 20 with face 12 determines cutting edge 44 proximate to cutting tip 32 and the junction of side 24 with face 12 determines cutting edge 48 proximate to cutitng tip 36. The junctions of the other face 14 with sides 18, 22 and 26 define, respectively, cutting edge 46 proximate to cutting tip 34, cutting edge 50 proximate to cutting tip 38 and cutting edge 42 proximate to cutting tip 30. All the cutting edges are preferably at the same angle, and that angle is less than ninety degrees.

A hole 52, disposed substantially at the geometric center of the prismatic block 10, is for the purpose of providing passage for a screw, bolt, eccentric pin, or any other suitable clamping and holding means for securing the insert in the pocket of a tool holder (not shown). It is obvious that hole 52 is not part of the invention and inserts may be made without such a hole.

Referring now to FIGS. 4–6, which represent a "diamond-shaped" cutting insert, the insert therein consists of a prismatic block 60 having two parallel faces 62 and 64 of substantially parallelogram shape. The prismatic block 60 is provided with sides 66, 68, 70 and 72 disposed at an angle other than ninety degrees relatively to the faces. Side 66 is parallel to side 70 and side 68 is parallel to side 72. The insert is thus provided with two cutting tips 74 and 78 corresponding to face 62 and with two cutting tips 76 and 80 corresponding to face 64, and the junctions between the respective sides and faces define cutting edge 82, proximate to cutting tip 74 and cutting edge 88, proximate to cutting tip 78, cutting edges 86 and 88 corresponding to face 62, and cutting edge 84, proximate to cutting tip 76 and cutting edge 86, proximate to cutting tip 80, cutting edges 84 and 86 both corresponding to face 64. All the cutting edges are preferably at the same angle, and that angle is less than ninety degrees.

The prismatic block 60 may also be provided with a hole 90 for the purpose of affixing the insert to a tool holder by conventional means.

FIG. 7 represents a perspective view of the example of the invention illustrated in FIGS. 4–6 shown mounted on a suitable holder 92 and adapted to turning a workpiece 94 mounted on a metal cutting lathe (not shown). For the sake of explaining a preferred way of using to advantages the functional qualities of an indexable insert according to the invention, it is assumed that the dash-dot line 96 represents the axis of the workpiece 94 and that line 96 is disposed in a horizontal plane. Dash-dot line 98 represents a radius of the workpiece, also disposed in a horizontal plane, line 100 representing a generatrix of the workpiece, or the locus described by the cutting tip 78 of the insert 60, when the cutting tip 78 is fed parallelly to the axis of the workpiece for the purpose of removing material from the periphery thereof.

Under those conditions, the insert 60 is disposed in the tool holder 92 in such a manner that the slope of line 102 defining the center line of the face 62 of the insert is at an angle *a* with line 98. It can thus be seen that the insert is cutting the workpiece with a negative back rake angle *a*. Also line 104, situated in the plane of face 62 and in a plane perpendicular to the horizontal plane, is disposed at an angle *b* with line 100. This angle *b* is the amount of positive side rake angle of the cutting insert 60. It can thus be seen that a cutting insert made according to the principles of the present invention may be mounted in an appropriate tool holder so as to cut a workpiece with a negative back rake and a positive side rake.

It is obvious that the geometry of the parallel faces of an insert according to the invention is immaterial as long as it is a polygon having an even number of sides such as a four-sided polygon (square, parallelogram or rectangle), a hexagon or an octagon. It is also obvious that the principles of the invention may be applied to a right-hand cutting insert, as well as to a left-hand cutting insert as herein described.

Having thus described the invention, what is claimed as new is:

1. An indexable and reversible symmetrical cutting insert having two polygonal parallel plane faces, each one of said faces having $n$ plane trapezoidal shaped identical sides and $n/2$ substantially equal cutting edges of less than ninety degrees, each said side forming in conjunction with one adjacent side and one of said plane faces, respectively, a pair of cutting tips.

2. An indexable and reversible symmetrical cutting insert having two even sided polygonal parallel faces and plane trapezoidal shaped identical sides disposed at an angle other than ninety degrees in relation to said faces so that every other side defines with each one of said faces a cutting edge of less than ninety degrees, each side forming in conjunction with one adjacent side and one of said faces, respectively, a pair of cutting tips.

References Cited by the Examiner
UNITED STATES PATENTS

| 3,137,918 | 6/1964 | Bruening | 29—95 X |
| 3,142,110 | 7/1964 | Hertel | 29—96 |
| 3,226,797 | 1/1966 | Hertel | 29—95 |

WILLIAM W. DYER, Jr., *Primary Examiner.*

HARRISON L. HINSON, *Examiner.*